7432X
J. B. MAAG.
Balances.
Patented Feb. 19, 1833.
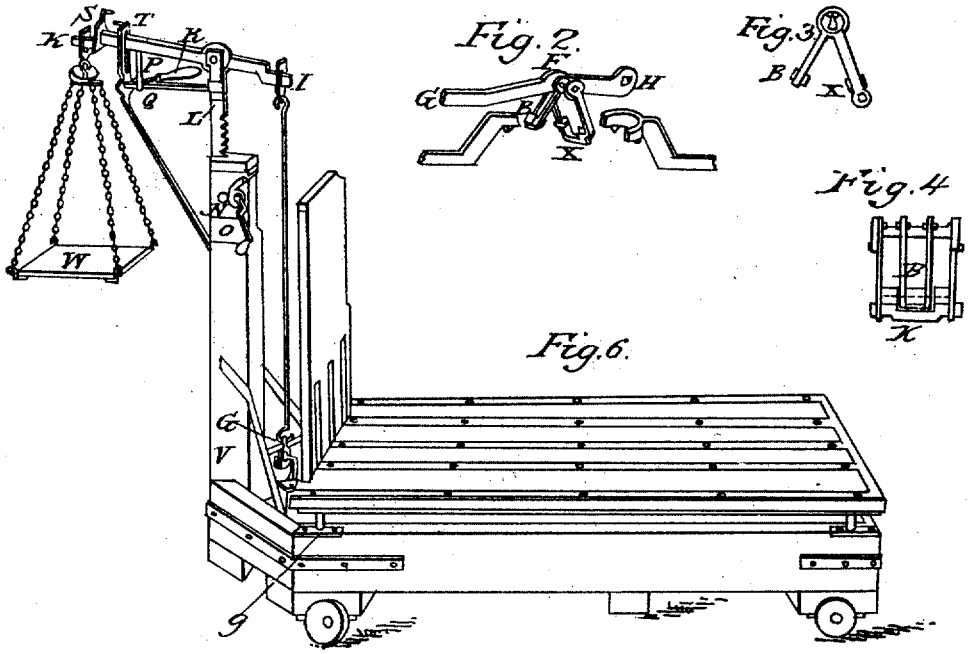
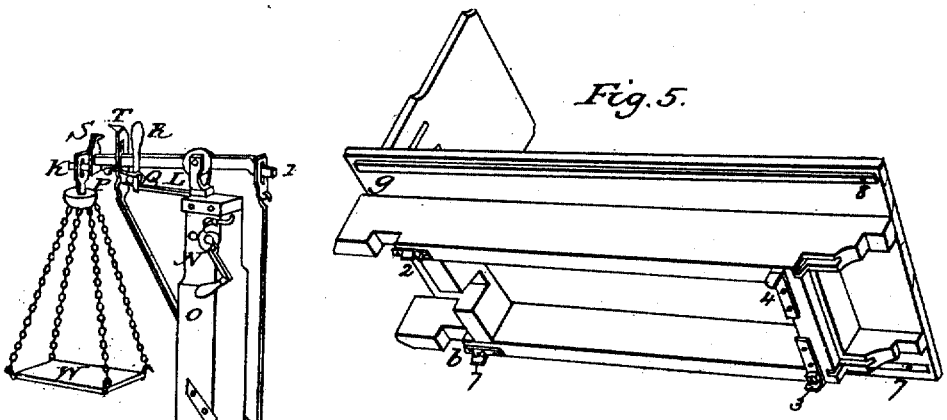
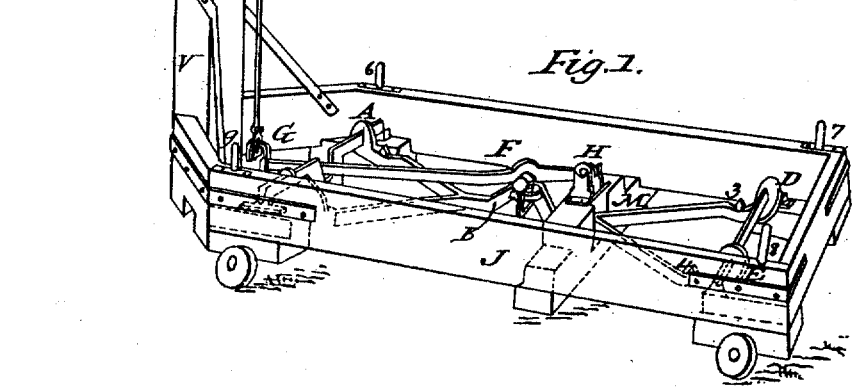

2/19/1833 1432X

Feb 19, 1833. 13.

John B. May of the City and State of New York.

Letters Patent.

The schedule referred to in these Letters Patent and making part of the same containing a description in the words of the said John Bablist May himself of his improvement in the Balance.

Be it known that I John Bablist May of the State City & County of New York, have invented and applied to use a new & useful improvement in the construction of Balances, or weighing scales made of several levers combined in various proportions so that a small weight shall equipoise the sum of the [illegible] of all their powers.

A true description of the construction of said Balances with my improvements and inventions therein & the manner of their use is as follows viz.

O.V.I. Fig 1 of the accompanying draft is a strong wooden frame upon which the machinery is constructed, & is either fixed in solid Masonry or made moveable on wheels as may be most convenient for the different purposes to which it is to be adapted. The weighing platform which forms the whole top of the lower part of the frame & on which the load is placed rests on the iron levers A.B, C.B, uniting near B, & on D.X, E.X uniting also near X the points of its contact with said levers being in the points 1, 2, 3 & 4. The four shorter arms of these levers being fixed in A, C, D & E & resting on the points connected with the frame as a fulcrum AB & CB two arms uniting near B, form a lever having its fulcrum A & C, the weight on the platform being applied equally to the points 1 & 2 & the greater arm of the lever is inserted in the moveable rectangular iron head piece B. Fig 2. by means of which one half of the whole weight becomes suspended on the third lever, G.H. at the point F. D.X & E.X, two arms uniting near X, also form another lever having its fulcrum in D & E, the weight or load being applied to the points 3 & 4, & the extremity of its greater arm at X, resting in the moveable rectangular iron head piece X, by means of which the ~~[illegible]~~ other half of the whole weight is suspended on the same lever, G.H, in X at the same point F. The moveable iron head piece B & X, Fig 2. being perpendicularly upon an axis or two arms [illegible] [illegible] [illegible]

1432X laterally to the lever G.H. on each side of it in F. and forms the gravitating point
of the lever G.H., the lever G.H. has its fulcrum in H. resting upon a firm support H.
fixed in the frame O.V.J. & the extremity of its arm G. is attached to the shorter arm
of the lever I.K. by the perpendicular connecting rod I.G. which rod suspends the lever G
H. with the load when the balances are in action or in a state of suspension,
I.K. is another lever which may be called the scale beam having its fulcrum in L. from the
greater arm of which at K. the scale W containing the weights is suspended,
The fulcrum L. is a moveable perpendicular iron bar serrated on the inner edge for
the purpose of admitting the groove of a small wheel turned by a windlass N of which
it forms part being supported by & inserted in the perpendicular post, N.V. by means
of which moveable bar wheel & windlass the whole combination of levers with the weigh
-ing platform is either elevated or depressed according to circumstances, elevated for the
purpose of being put in a state of suspension when the true weight is to be ascertained
or depressed that the machinery may be at rest.
The greater arm of the lever I.K. being kept confined by & moveable in the project
ing iron bar T.P. is by means of the small rectangular piece of iron P.R. with a
wooden handle which moves on a pivot at Q. raised up and secured under T.
The windlass being then turned up the levers are all raised with it & brought
to act upon and bear up the load on the platform in a state of suspension, & serving
also to keep the platform free from contact, with the frame & prevents all friction
with it while the true weight is being ascertained.
When the windlass is let down the whole platform rests upon the four supporters
6. 7. 8 & 9. fixed in the frame and thus the whole construction of the machine when
not in operation is preserved from injury and in a steady fixed position for the
reception of a load, of the two points S & T. which serve to ascertain the equipoise
of the weights in the scale W with the load S. is moveable attached to the end of the
scale beam I K & T is stationary and fixed to the upright perpendicular post so that
when the points meet the scale beam is exactly horizontal & the true weight indicated,
Fig 2 is a draft showing the particular & exact insertion of the two levers being
into the moveable rectangular iron head piece B & X. and their connexion
with the lever G.H. & dependence upon the axis F.
Fig 3. is a lateral view of Fig 4 a front view of these rectangular iron
head pieces. Fig 5. is a view of the weighing platform detached from the ma-
-chinery

[illegible] shewing also the point, by which it rests upon the lower levers.
Fig. 6. is a view of the machine at rest. That which is specially claimed as a new invention & improvement are the disposition & distribution of the whole weight equally upon the four lower levers so as to unite their power with the total weight in the point F of the lever G, H, together with the construction position & combination of those lower levers.
Also the construction, position & operation of the moveable serrated iron bar forming a fulcrum for the scale beam, together with the windlass & wheels connected therewith by which the whole scale and platform are acted upon & suspended in equilibrium.

John Babbitt [illegible]

Witnesses,
Saml. Hart Taylor
John N. Taylor (Dr. in portfolio) 1278 [illegible]

[illegible]
Chf. W.